United States Patent
Watanabe

[11] Patent Number: 5,923,638
[45] Date of Patent: Jul. 13, 1999

[54] DISK REPRODUCING APPARATUS HAVING AN AUTO-CHANGER

[75] Inventor: Kazuyuki Watanabe, Fukushima, Japan

[73] Assignee: Nippon Columbia Co., Ltd., Tokyo, Japan

[21] Appl. No.: 08/805,070

[22] Filed: Feb. 25, 1997

[30] Foreign Application Priority Data

Mar. 14, 1996 [JP] Japan .................................. 8-057180

[51] Int. Cl.⁶ .................................................. G11B 17/28
[52] U.S. Cl. ........................................... 369/192; 369/36
[58] Field of Search .................................. 369/34, 36, 38, 369/39, 178, 179, 191, 192, 194, 195, 197, 199, 200, 201, 202; 360/98.04, 98.06, 99.06, 99.07, 99.02, 99.03

[56] References Cited

U.S. PATENT DOCUMENTS

| | | | |
|---|---|---|---|
| 4,610,008 | 9/1986 | Ishibashi et al. | 369/34 |
| 4,633,452 | 12/1986 | Shimbo et al. | 369/39 |
| 4,695,990 | 9/1987 | Kawakami | 369/38 |
| 5,303,098 | 4/1994 | Yamamori et al. | 360/99.12 |
| 5,729,524 | 3/1998 | Pines et al. | 369/178 |

FOREIGN PATENT DOCUMENTS

| | | | |
|---|---|---|---|
| 58-203669 | 11/1983 | Japan . | |
| 60-138767 | 7/1985 | Japan . | |
| 1-50275 | 2/1989 | Japan | 369/36 |
| 2-260293 | 10/1990 | Japan | 369/199 |
| 3-91159 | 4/1991 | Japan . | |
| 4-341968 | 11/1992 | Japan . | |
| 5-89586 | 4/1993 | Japan . | |
| 8-167206 | 6/1996 | Japan . | |
| 8-167221 | 6/1996 | Japan . | |
| 8-167222 | 6/1996 | Japan . | |

Primary Examiner—David L. Ometz
Attorney, Agent, or Firm—Dickstein Shapiro Morin & Oshinsky, LLP

[57] ABSTRACT

A disk reproducing apparatus having an auto-changer allowing information recorded on both sides of a disk to be reproduced. The apparatus has a storing unit for storing disks having information recorded on both sides, a reproducing unit for reproducing the information recorded on a disk, and a transferring unit, for extracting a disk from the storing unit and holding it in a disk loader and transferring it to the reproducing unit. The disk loader has first and second disk holding means which hold the disk on one and the other side surface, respectively of the disk loader by extracting the disk from the storing unit and moving the disk in a direction parallel to the surface of the disk, and a rotating-down means for rotating-down the disk loader toward either of two directions opposite to each other. The transferring unit transfers the disk between a predetermined position of the storing unit and the reproducing unit by holding the disk in the first disk holding means to set one surface of the disk in a reproducible state, and transfers the disk between a predetermined position of the storing unit and the reproducing unit by holding the disk in the second disk holding means to set the other surface of the disk in a reproducible state.

6 Claims, 6 Drawing Sheets

DISK REPRODUCING APPARATUS HAVING AN AUTO-CHANGER

BACKGROUND OF THE INVENTION

The present invention relates to a disk reproducing apparatus having an auto-changer storing a plurality of optical disks and reproducing information recorded on the optical disks, and more particularly relates to a disk reproducing apparatus having an auto-changer capable of reproducing information recorded on both sides of a disk.

A disk reproducing apparatus having an auto-changer storing a plurality of optical disks and reproducing information recorded on the optical disks is disclosed, for example, in Japanese Patent Application Laid-Open 4-341968. Further, U.S. patent application Ser. No. 08/567,768, filed Dec. 5, 1995, titled "Disk Reproducing Apparatus having Auto-Changer", which has been applied for by the author of the present invention, discloses a disk reproducing apparatus having an auto-changer which comprises a storing unit for storing disks, a reproducing unit for reproducing information recorded on a disk mounted on the reproducing unit and a transferring unit for extracting a disk from the storing unit and transferring the disk by holding it using a disk loader to mount it on the reproducing unit, wherein the disk loader is designed in such a construction as to hold the disk extracted from the storing unit by moving it in a direction parallel to the disk surface and returning it to the storing unit by moving it in the opposite direction parallel to the disk surface after reproducing information in the reproducing unit. These disk reproducing apparatuses having an auto-changer are designed so as to deal with a disk having information recorded on one side.

On the other hand, as for a disk reproducing apparatus having an auto-changer for reproducing information recorded on both sides of a disk, each of Japanese Patent Application Laid-Open No.5-89586 and Japanese Patent Application Laid-Open No.60-138767 discloses an apparatus which comprises two optical pickups for reproducing information recorded on both sides of a disk.

Further, each of Japanese Patent Application Laid-Open No.3-91159 and Japanese Patent Application Laid-Open No.58-203669 discloses a mechanism for reversing an optical pickup corresponding to a surface on which information to be reproduced exists. Furthermore, a disk chucking means for a disk reproducing apparatus having an auto-changer is described in a specification of U.S. Pat. No. 5,303,098.

However, in the apparatus having two optical pickups described above, the constructions of the transferring mechanism and the reproducing mechanism become complex and accordingly its cost is increased. On the other hand, the apparatus reversing a disk or the optical pickup for reproducing information recorded on both side surfaces of the disk has disadvantages in that the apparatus becomes large in size since the construction for reversing the disk or the optical pickup becomes complex and a space for reversing it is additionally required.

SUMMARY OF THE INVENTION

An object of the present invention is to provide a disk reproducing apparatus having an auto-changer which can reproduce information recorded on both sides if a disk with a simple and compact construction.

The present invention is characterized by a disk reproducing apparatus having an auto-changer comprising a storing unit for storing a plurality of disks having information recorded on both sides; a reproducing unit for reproducing the information recorded on the disk; and a transferring unit for transferring the disk between the storing unit and the reproducing unit by holding the disk with a disk loader; wherein the disk loader of the transferring unit comprises a first disk holding means which is capable of holding the disk on one side surface of the disk loader by extracting the disk from the storing unit and moving the disk in a direction parallel to the surface of the disk, a second disk holding means which is capable of holding the disk on the other side surface of the disk loader adjacent to the first disk holding means by extracting the disk from the storing unit and moving the disk in a direction parallel to the surface of the disk; and a rotating-down means for rotating-down the disk loader toward either of two directions opposite to each other; and thereby the transferring unit transfers the disk between a predetermined position of the storing unit and the reproducing unit by holding the disk in the first disk holding means to set one surface of the disk on the reproducing unit in a reproducible state, and transfers the disk between a predetermined position of the storing unit and the reproducing unit by holding the disk in the second disk holding means to set the other surface of the disk in a reproducible state.

Further, the present invention is characterized by a disk reproducing apparatus having an auto-changer comprising a storing unit for storing a plurality of disks having information recorded on both sides in a vertical position; a reproducing unit for reproducing information recorded on the disk in a horizontal position; and a transferring unit for extracting the disk from the storing unit and transferring the disk to set the disk to the reproducing unit by holding the disk with a disk loader; wherein the transferring unit comprises a disk loader which holds the disks in a vertical position on both the surfaces of the disk loader adjacent to each other and rotates down both side surfaces of the disk loader to a horizontal position toward either of two directions opposite to each other, the disks having been extracted from the storing unit at predetermined holding positions to the storing unit and having been moved in a direction parallel to the disk surface; a transferring means which transfers the disk loader together with the held disks in a direction perpendicular to the disk surface to a predetermined reproducing position of the reproducing unit and sets the held disk on the reproducing unit by rotating down the disk loader from the vertical position to either of the horizontal positions at the predetermined reproducing position; and a rotating-down means which rotates down the disk loader together with the held disks on the reproducing unit in the horizontal position when the disk loader is transferred to the predetermined reproducing position.

According to the present invention, since the disk loader holds disks in a vertical position on both side surfaces of the disk loader adjacent to each other and the disk loader is designed so that both side surfaces are rotated down toward either of two directions opposite to each other, it is possible to provide a disk reproducing apparatus having an auto-changer which is simple in construction for reproducing information recorded on both side surfaces of the disk, low in cost and high in reliability.

DETAILED DESCRIPTION OF THE PREFERRED EMBODIMENTS

Figure 1:
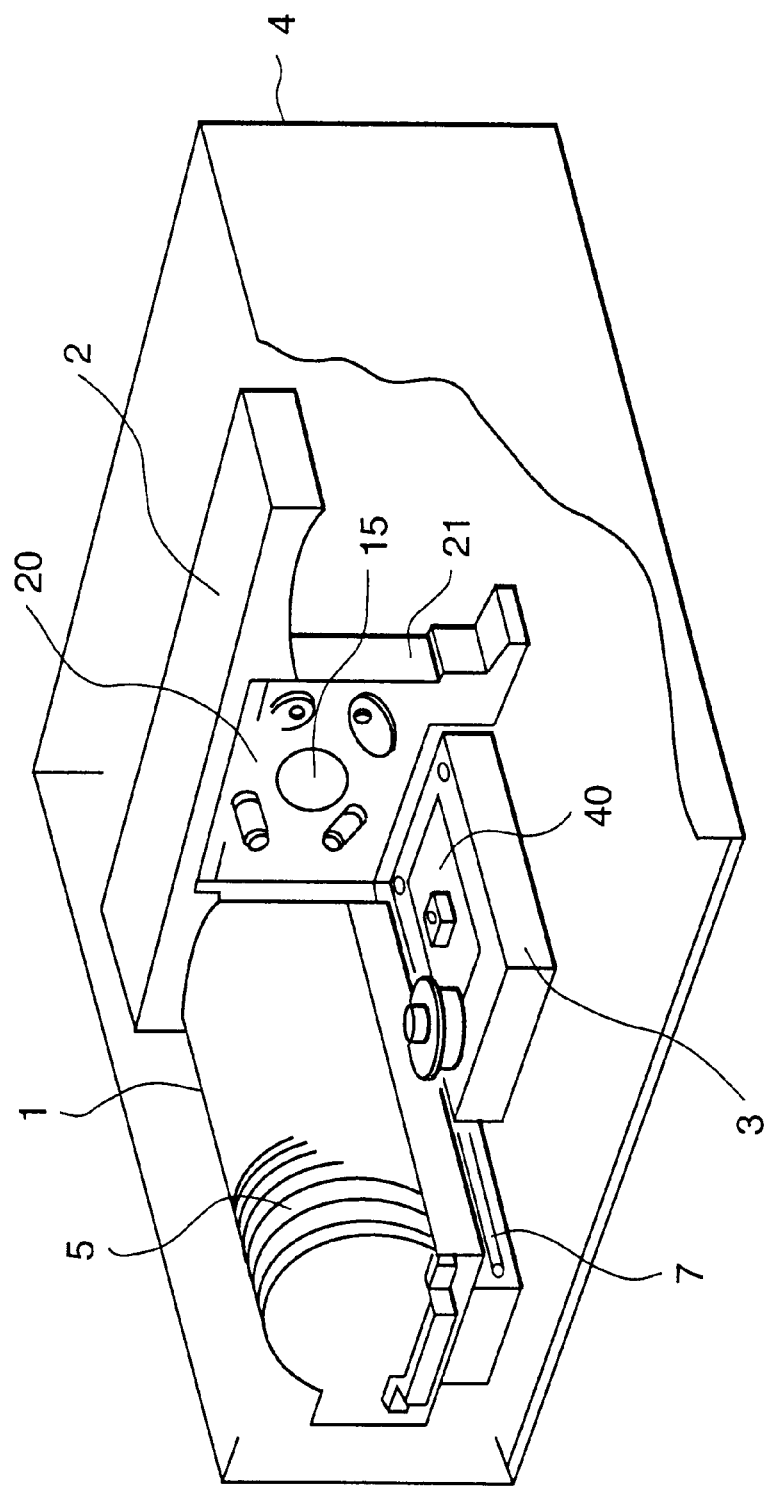
FIG. 1 is a perspective view showing an embodiment of a disk reproducing apparatus having an auto-changer in accordance with the present invention.
Figure 2:
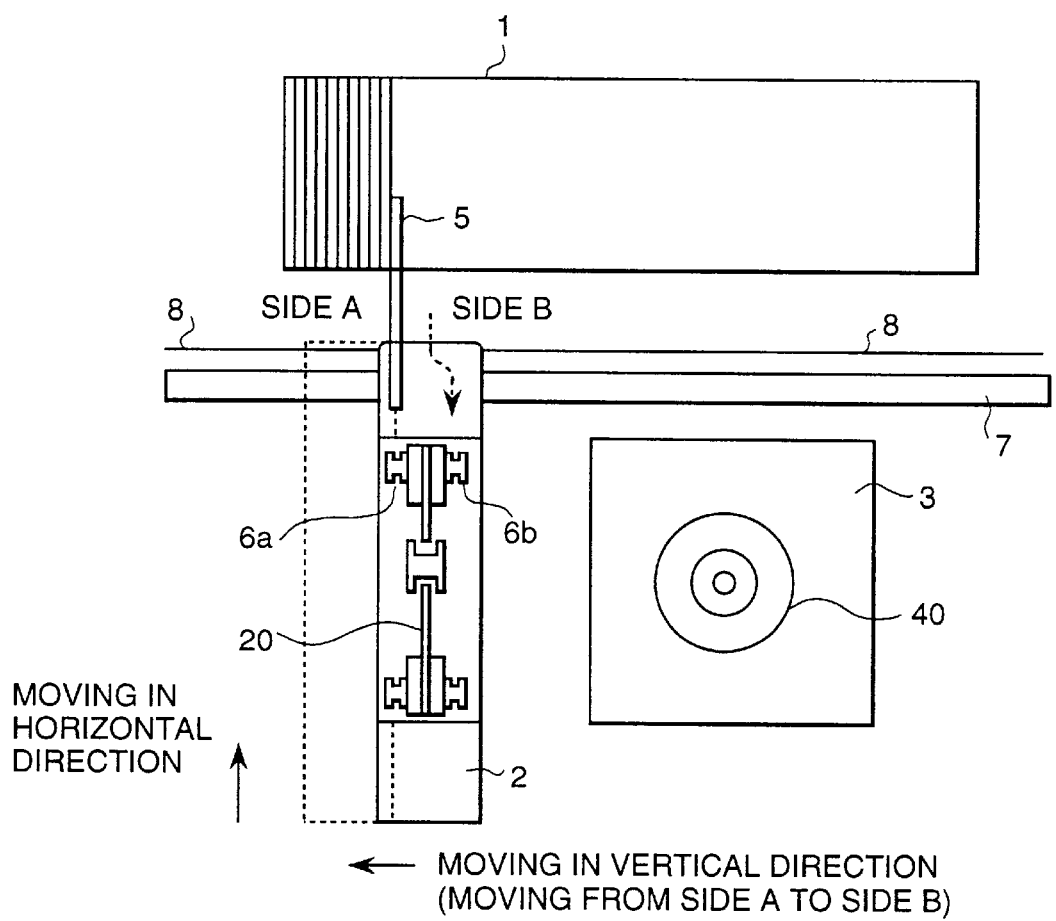
FIG. 2 is a plane view showing the disk reproducing apparatus having an auto-changer of FIG. 1.

An embodiment of a disk reproducing apparatus having an auto-changer according to the present invention will be described in detail below. The construction will be described in outline, referring to FIG. 1 and FIG. 2. FIG. 1 is a perspective view showing the disk reproducing apparatus having an auto-changer, and FIG. 2 is a plane view of FIG. 1.

The disk reproducing apparatus having an auto-changer comprises a disk storing unit 1 (hereinafter referred to as "storing unit 1") for storing a plurality of disks 5, a disk transferring unit 2 (hereinafter referred to as "transferring unit 2") for transferring and setting the disk 5 to and on a reproducing unit 3, the reproducing unit 3 for reproducing information recorded on the disk 5, and a mounting body 4 for mounting these units. The reproducing unit 3 is also called a player and has a turntable 40 for reproducing.

The transferring unit 2 has a disk loader 20 in the center and a frame 21 on the periphery of the disk loader 20, and is designed so as to be able to be moved along a rail 7 in a longitudinal direction of the storing unit 1, that is, in a direction perpendicular to the disk surfaces, across over the reproducing unit 3. The transferring unit 2 is moved on the rail by a drive wire 8 extending along the rail driven by a motor, not shown.

The disk reproducing apparatus having an auto-changer reproduces information by transferring a disk 5 to be reproduced to the reproducing unit 3 using the transferring unit 2 and sets the disk 5 on the turntable 40 in side-A upside.

After completion of reproducing, the transferring unit 2 is moved along the rail 7 to a predetermined position corresponding to a vacant place in the storing unit 1 where the disk 5 can be stored. The disk 5 having been held in a first disk holding means 6a in the side A of the disk loader 20 is moved in the direction parallel to the disk surface up to the predetermined position to be temporarily stored in the storing unit 1.

Then, the transferring unit 2 is moved in the direction perpendicular to the disk surface from the side A holding position (a position shown by a solid line in FIG. 2) up to a side B holding position (a position shown by a dashed line in FIG. 2) to extract the disk 5 having been temporarily stored in the storing unit 1 into the side B of the disk loader 20 again. The transferring unit 2 again moves the disk 5 having been temporarily stored in the storing unit in the direction parallel to the disk surface to hold the disk 5 in a second disk holding means 6b which is adjacent to the first disk holding means 6a.

That is, the disk 5 held in the side B of the disk loader 20 is reversely set on the turntable 40 in side-B upside. By the operation described above, the disk 5 on the side A of the disk loader 20 can be extracted and set in the side B of the disk loader.

Figure 3:
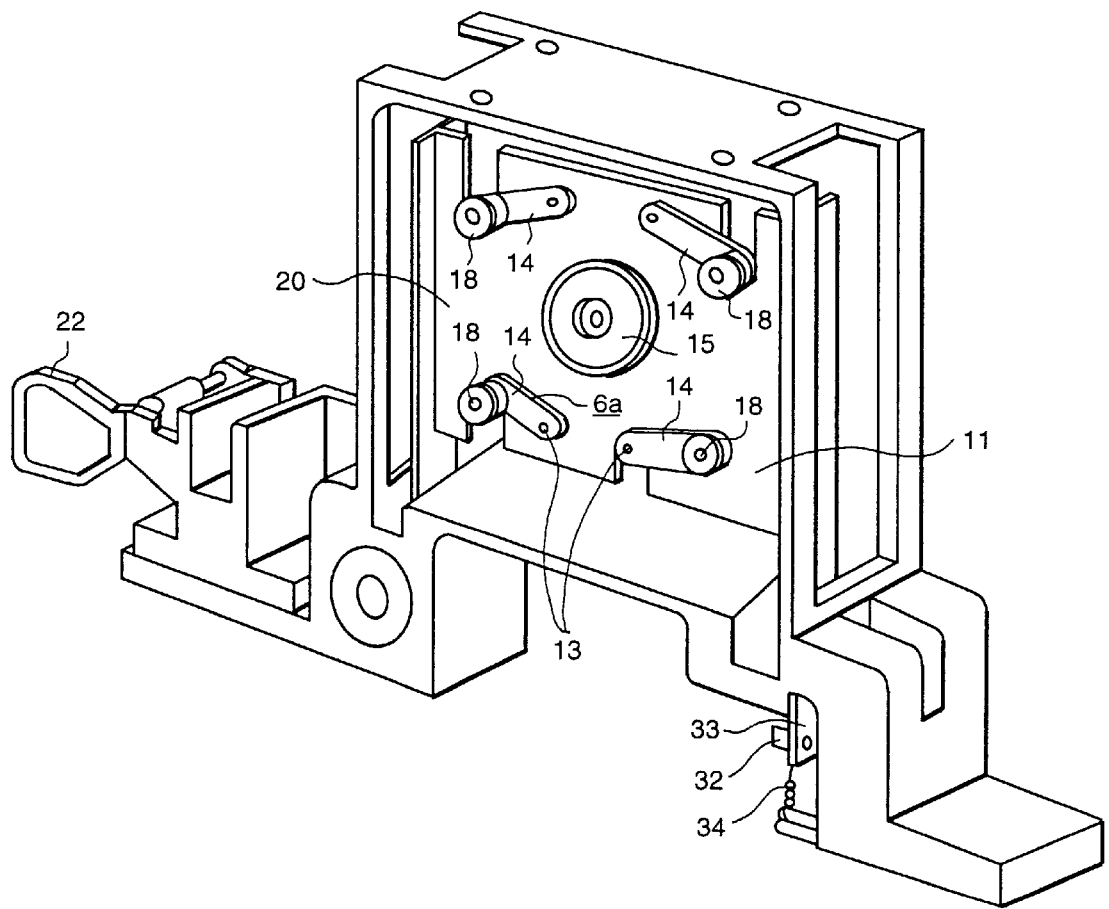
FIG. 3 is a perspective view showing a transferring unit of the disk reproducing apparatus having an auto-changer of FIG. 1.
Figure 4:
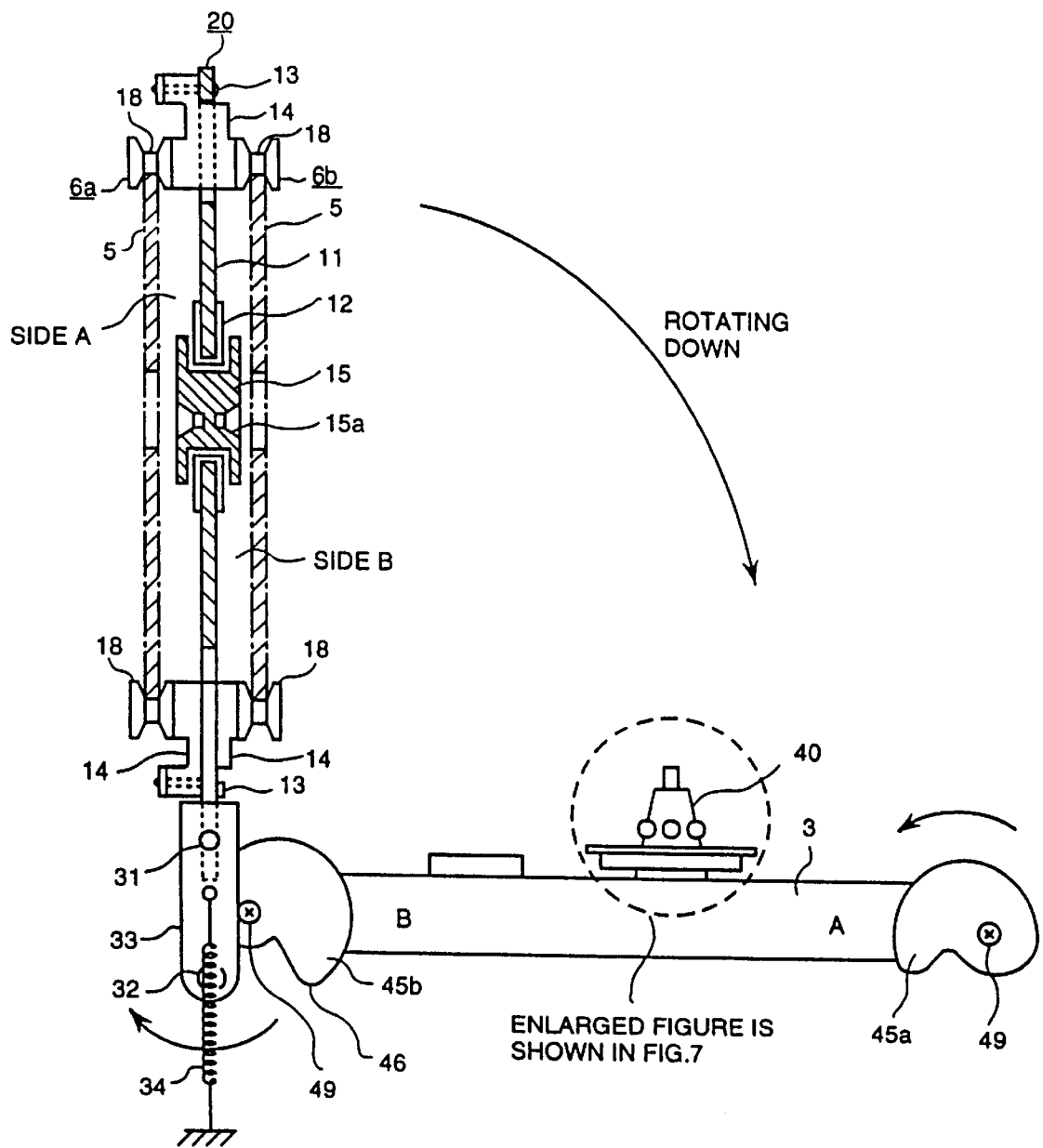
FIG. 4 is a cross-sectional view showing a disk loader provided in the transferring unit of FIG. 3.

The construction and the operation of the aforementioned disk reproducing apparatus having an auto-changer will be described below further in detail, referring to FIG. 3 and FIG. 4. FIG. 3 is a perspective view showing the transferring unit 2 of the disk reproducing apparatus having an auto-changer of FIG. 1. FIG. 4 is a cross-sectional view showing a disk loader 20 provided in the transferring unit 2 of FIG. 3.

The transferring unit 2 is composed of the disk loader 20 in the center and the frame 21 in the periphery of the disk loader 20, a member 22, a transferring roller, not shown, and so on. The disk loader 20 has a loader portion 11, a protector 12, support shafts 13, arms 14, a clamper 15, roller guides 18, a rotating-down shaft 31, a rotating-down pin 32, a pin support portion 33 and a rotating-down spring 34.

The disk loader 20 has a first disk holding means 6a and a second disk holding means 6b for directly holding a disk 5 in both sides of the clamper 15. That is, the disk loader 20 has the first disk holding means 6a and the second disk holding means 6b in both sides of the loader portion 11, the side A and the side B shown in FIG. 4, respectively. Each of the first disk holding means 6a and the second disk holding means 6b has the support shafts 13, the arms 14 and the roller guides 18 arranged in the four corners of the loader portion 11.

The transferring unit 2 has two sets of optical sensor units, not shown, for detecting a position detecting plate, not shown, provided in the storing unit 1. The transferring unit 2 further has a holding positioning means for positioning either of the side A or the side B of the disk holding means 6a and 6b to the storing unit 1 in order to extract the disk 5 using an output from the optical sensor unit, or storing positioning means for storing the disk in the storing unit 1. Further, the transferring unit 2 has two sets of reproducing positioning means for positioning the transferring unit 2 to the reproducing unit 3 in order to select reproducing information recorded on either of the side A or the side B of the disk 5. Although a number of the positioning means in this embodiment described above are different from that in the prior art, the construction of the positioning means is the same as that in the prior art, U.S. patent application Ser. No. 08/567,768. Therefore, detailed description of the positioning means is omitted here.

In order to set the disk 5 from the transferring unit 2, that is, the disk loader 20, to the reproducing unit 3, the disk loader 20 arranged in the central portion of the transferring unit 2 is constructed so as to be rotated down in a horizontal position around the rotating-down shaft 31 as a center toward the both directions opposite to each other in the both sides of the loader portion 11.

Operations of the transferring unit 2 and the disk loader 20 having the above constructions will be described below, referring to FIG. 1 to FIG. 4. The disk 5 is stored in the storing unit 1 in such a position that the disk surface is vertical, whereas the reproducing unit 3 is placed in a horizontal position. The disk 5 is extracted from the storing unit 1 by being lifted up using the member 22 of the transferring unit 2 which is moved to a predetermined position, for example, to the side B holding position of the storing unit 1 according to the holding positioning means. After that, the disk 5 is moved toward the disk loader 20 in the central portion of the transferring unit 2 using the transferring roller, not shown, while the disk surface is being maintained in the vertical position.

Then, when the disk 5 is moved toward the disk loader 20 using the transferring roller, the plurality of arms 14 arranged rotatably around the support shafts 13 as centers are rotated inner directions so that the roller surfaces provided in the arms 14 clamp and hold the periphery of the disk 5. For example, the disk 5 is held by the disk holding means 6b in the side B of the disk loader 20, as shown in FIG. 4.

The disk 5 held by the disk loader 20 of the transferring unit 2 is moved along the rail 7 across over the reproducing unit 3 and loaded (transferred) up to a predetermined position of the reproducing unit 3, that is, the side B reproducing position according to the reproducing positioning means while the disk 5 is being maintained in the vertical position.

After completion of loading, a cam 45b provided in the side of the reproducing unit 3 is rotated in a clockwise direction around a supporting shaft 49 as a center and a depressed portion 46 provided in the cam 45b is brought in contact with the rotating-down pin 32 provided in the supporting portion 33 of the disk loader 20 to rotate the whole of the disk loader 20 down toward the reproducing unit 3 in a clockwise direction around the rotating-down shaft 31 as a center. That is, the disk loader 20 is rotated down in a horizontal direction together with the disk 5 and the clamper 15 by rotating the cam 45b to set the disk 5 held in the disk loader 20 onto the turntable 40.

Then, the arms 14 of the disk holding means 6b in the disk loader 20 are rotated toward an outer side direction so that the disk 5 is released from clamping by the rollers provided on the arms 14. After that, the disk loader 20 is returned to its original vertical position, and accordingly the clamper 15 is also returned to the original position. By doing so, only the disk 5 held in the disk loader 20 is set onto the turntable 40. In that time, movement of the disk 5 between the storing unit 1 and the transferring unit 2 is in the direction parallel to the disk surface, and movement of the transferring unit 2 over the reproducing unit 3 is in the direction perpendicular to the disk surface.

Although the example shown in FIG. 4 is a case where information recorded on the side B of the disk 5 is reproduced, information recorded on the side A of the disk 5 can be reproduced by holding the disk 5 with the disk holding means 6a in the side A at a predetermined position of a side-A holding position and positioning the transferring unit 2 to a predetermined position of the side-A reproducing position and then rotating the cam 45a in counterclockwise direction around the supporting shaft 49 as a center. Exchange from the side A to the side B is the same as described above in FIG. 2.

Figure 5A:
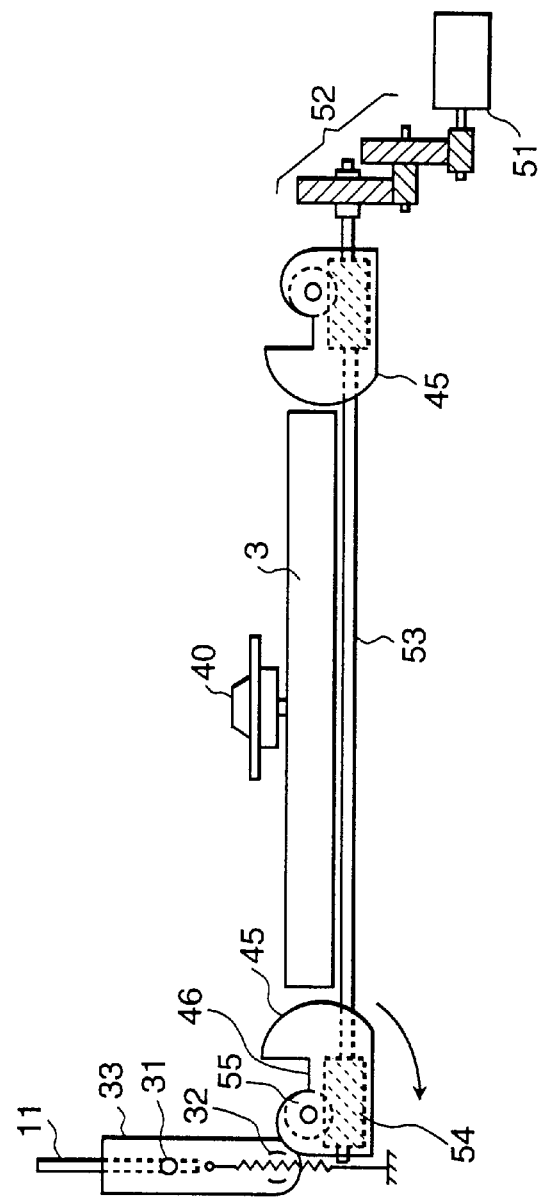
FIG. 5A is a front view showing an embodiment of a rotating-down means in a disk loader in accordance with the present invention.
Figure 5B:
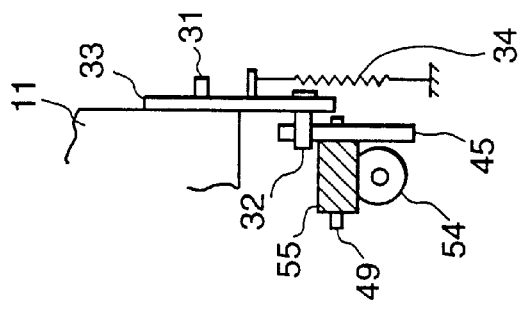
FIG. 5B is a side view of FIG. 5A.

FIG. 5A is a front view showing an embodiment of a rotating-down means in a disk loader in accordance with the present invention. FIG. 5B is a side view of FIG. 5A. The rotating-down means of the disk loader 20 is composed of a rotated-down means and a rotating-down drive means. The rotated-down means is composed of a rotating-down shaft 31, rotating-down pin 32, a pin support portion 33, a rotating-down spring 34 which are connected to the disk loader 20 of the transferring unit 2. The rotating-down drive means is composed of a cam 45 and a support shaft 49 placed in the side of the reproducing unit 3, and a motor 51, a gear unit 52, a shaft unit 53, a worm gear 54, a helical gear 55 and so on. The reproducing unit 3 and the rotating-down drive means are not always necessary to be connected or integrated in a unit, but they may be arranged anywhere as far as they are constructed so as to position the side A and the side B reproducing positions.

Operation of the disk loader 20 is as follows. As shown in FIG. 5, the motor 51 for rotating the cam 45 is arranged in a side surface portion of the reproducing unit 3. Rotating speed of the motor 51 is reduced by the gear unit 52 to drive the shaft unit 53 which is interlocked with the gear unit 52. The cam 45 arranged in a predetermined position is rotated clockwise or counterclockwise through the worm gear 54 and the helical gear 55. The transferring unit 2 transfers the disk loader 2 having the rotating-down pin 32 to a predetermined position where a cam 45 is arranged so that the rotating-down pin 32 and the cam 45 are engaged and contacted with each other at the predetermined reproducing position.

By rotating the support shaft 49 of the cam 45 provided in the side of the reproducing unit 3 in the clockwise direction or the counterclockwise direction, the disk loader 20 transferred to the predetermined position is rotated down in a direction of the right hand side or the left hand side toward the reproducing unit 3 around the rotating-down shaft 31 by hooking the rotating-down pin 32 provided in the pin support portion 33 of the disk loader 20 to the depressed portion 46 provided in the cam 45.

In the present embodiment of the cam-pin type as described above, the construction of the rotating-down mechanism is simple, and particularly the construction is preferable for a case where the rotated-down means and the rotating-down drive means are separately arranged. That is, in this embodiment, the rotating-down drive means with the motor 51, gear unit 52 and so on used for rotating down a rotated-down means is not mounted on the transferring unit 2, which is different from the construction in the prior art, U.S. patent application Ser. No. 08/567,768.

Therefore, this embodiment has an advantage in that the transferring unit 2 can be made light in weight and consequently can be moved fast. It is needless to say that both of the rotated-down means and the rotating-down drive means may be arranged in the side of the transferring unit 2 as the same as in the prior art, U.S. patent application Ser. No. 08/567,768.

Thus, it is possible to construct a disk reproducing apparatus having an auto-changer which is capable of reproducing information recorded on both sides, side A or side B, of a disk 5 by selecting either of the disk holding means for holding side-A disk or side-B disk according to the holding positioning means, by positioning the transferring unit 2 to either of positions in the reproducing unit 3 for reproducing side-A or side-B matching with the reproducing positioning means, and by fixing the disk 5 rotated down toward the reproducing unit 3 at that position according to the chucking mechanism portion provided in the turntable 40.

Figure 6:
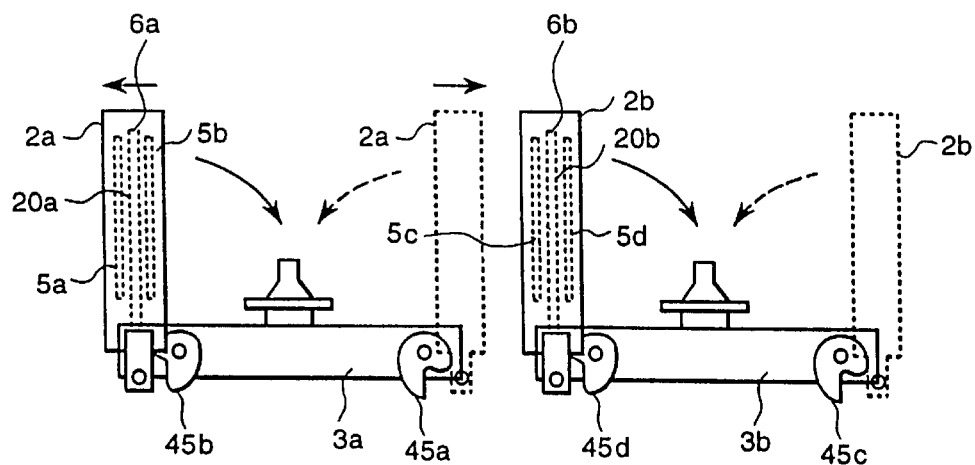
FIG. 6 is a schematic view showing a transferring unit in another embodiment of a disk reproducing apparatus having an auto-changer in accordance with the present invention.

FIG. 6 is a schematic view showing a transferring unit in another embodiment of a disk reproducing apparatus having an auto-changer in accordance with the present invention. The other portions are the same as those in the embodiment described in FIG. 1 to FIG. 5.

This embodiment is a case where two transferring units 2a, 2b are provided as the transferring unit 2. In this case, two disks 5a and 5b are held in both sides of the disk loader 20a and two disks 5c and 5d are held in both sides of the disk loader 20b. The transferring units 2a, 3b are successively moved and sets the disks 5a, 5b, 5c, 5d on the reproducing units 3 by successively using the cams 45a, 45b, 45c, 45d to perform continuous reproducing. In this embodiment, the disk holding means 6a, 6b are constructed so as to independently hold the disks 5 respectively.

It can be summarized from the above that the present invention is characterized in that the transferring unit for transferring disks from the storing unit to the reproducing unit guides and holds disks to and in positions adjacent to each other in both sides of the loader portion having clampers of the disk loader provided in the transferring unit, and in that operation of setting the disk held in the disk loader onto the reproducing unit placed in horizontal is performed by rotating down the disk. Further, the present invention is characterized in that the disk loader is constructed to be rotated down toward both sides so that the disks held in both side surfaces adjacent to each other through the loader portion, that is, the clamper may be chucked by the turntable of the reproducing unit.

Thereby, it is possible to provide a disk reproducing apparatus having an auto-changer which is simple in construction and accordingly low in cost and high in reliability since reproducing information recorded on both side surfaces of a disk can be performed without using two optical pickups for reproducing information recorded on both side surfaces of a disk, without reversing an optical pickup corresponding to a surface to be reproduced or without employing such a complex mechanism in the prior arts for reversing the disk.

Figure 7:
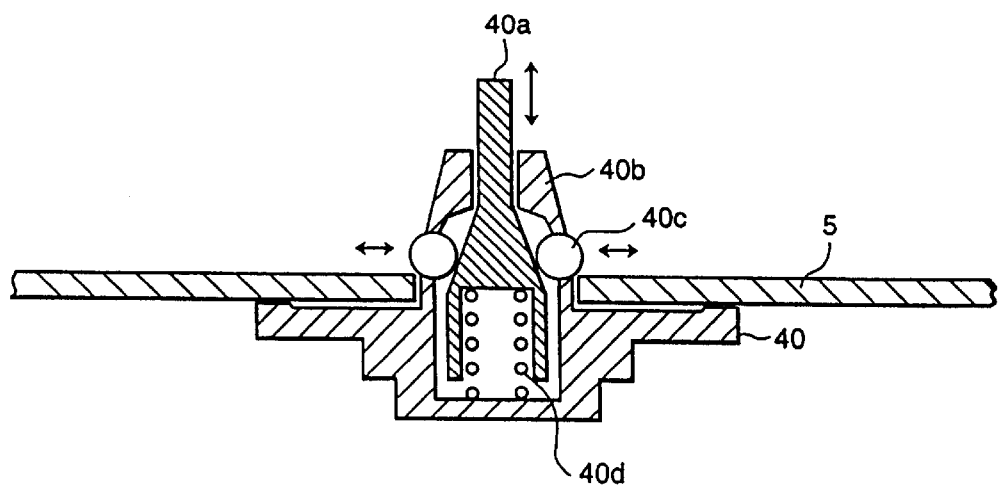
FIG. 7 is a cross-sectional view showing an embodiment of a disk chucking means in accordance with the present invention.

An embodiment of a disk chucking mechanism in accordance with the present invention will be described below. FIG. 7 is a cross-sectional view showing an embodiment of a disk chucking means in accordance with the present invention which is an enlarged view of the turntable portion of FIG. 4.

The disk chucking means provided in the turntable 40 is composed of a conical core portion 40a pressed down from the upper side by a clamper 15 rotated down together with the disk loader 20, a cylindrical chucking portion 40b for holding the conical core portion 40a and a spring 40d inside the cylinder, a plurality of balls 40c which are radially interposed between a conical surface of the conical core portion 40a and the inner surface of the cylinder of the cylindrical chucking portion 40b, and the spring 40d for applying a force from the down side on the conical core portion 40a against the pressing force of the clamper 15. The number of the balls is preferably more than three from the standpoint of reliability of chucking. If the number is three, it is preferable because the force is distributed uniformly with the minimum number. However, it does not deny to employ two balls.

The construction as well as the operation of the disk chucking means will be described below in detail. When the disk loader 20 is rotated down by the cam 45, the clamper 15 provided in the central portion of the disk loader 20 presses the conical core portion 40a of the turntable 40 in the reproducing unit 3 to release the force by the spring 40d through the conical surface applied to the balls 40c radially embeded in the cylindrical chucking portion 40b. Thereby, it makes easy to set the disk 5 on the turntable 40. That is, the balls 40c are radially drawn in the inner direction so that the outer diameter formed by the plurality of balls 40c becomes small, and consequently the disk 5 can be smoothly set on the turntable 40.

Then, the arms 14 of the disk holding means in the disk loader 20 are expanded in the outer directions to put the disk 5 on the turntable 40, and the disk loader 20 is returned to the original position. Therefore, since the clamper 15 is also returned and the pressing force of the clamper 15 onto the core portion 40a is released, the balls 40 are radially expanded in the outer directions by the force of the spring 40d applied onto the conical surface to apply a force onto the disk 5 or the central hole of the disk 5 from the slanting upper directions. That is, the disk 5 is fixed onto the turntable 40 and at the same time positioned at the center. As described above, the disk chucking means of the present embodiment does not need to install a mechanism for attaching and detaching the clamper is in the side of the reproducing unit 3, and can certainly fix the disk on the turntable 40 with a simple construction.

Further, as shown in FIG. 4, the clamper 15 provided in the central portion of the disk loader 20 has a taper depressed portion 15a. This taper depressed portion 15a is brought in contact with the core portion 40a of the turntable 40 to certainly perform positioning between the disk 5 and the turntable 40.

That is, in the prior art, since both a disk and a clamper are put on the turntable and then the disk is chucked, a mechanism for release of the clamper is required, and attaching and detaching the clamper itself takes a long time. On the other hand, in the disk chucking means in accordance with the present invention, since the disk 5 can be clamped only by putting the disk 5 onto the reproducing unit 3, the mechanism for attaching and detaching a clamper can be eliminated. Therefore, this leads to simplification of the disk chucking mechanism. Further, since the disk 5 can be certainly chucked on the turntable 40 only by rotating down the disk loader 20, there is an advantage in that operation of reproducing can be started in a short time.

According to the present invention, since information recorded on both sides of a disk can be reproduced without any complex mechanism, there is an effect in that it is possible to provide a disk reproducing apparatus having an auto-changer which is simple in construction, low in cost, and high in reliability.

Further, since the rotated-down means and the rotating-down drive means are separately arranged, there is an effect in that the transferring unit is light in weight and fast in movement.

Furthermore, since the disk chucking mechanism does not have any mechanism for attaching and detaching the clamper, there is an effect in that the disk can be certainly fixed to the turntable with a simple construction and operation of reproducing can be started in a short time.

What is claimed is:

1. A disk reproducing apparatus having an auto-changer comprising a storing unit for storing a plurality of disks having information recorded on both sides of said disks;

a reproducing unit for reproducing the information recorded on each of said disks;

a disk loader which includes a first disk holding means capable of holding one of said disks on one side surface of said disk loader by extracting said one of said disks from said storing unit and moving said one of said disks in a direction parallel to a surface of said one of said disks, and a second disk holding means capable of holding a second one of said disks on the other side surface of said disk loader adjacent to said first disk holding means by extracting said a second one of said disks from said storing unit and moving said a second one of said disks in a direction parallel to a surface of said a second one of said disks;

a transferring unit for transferring said disk loader together with one to two of said disks held by said disk loader between said storing unit and said reproducing unit; and a rotating-down means for rotating said disk loader downward in one of two opposing directions;

wherein said transferring unit transfers a selected one of said disks between a predetermined position in said storing unit and said reproducing unit by holding said selected disk in said first disk holding means to set one recorded surface of said selected disk on said reproducing unit in a reproducible state, and also transfers said selected disk between a predetermined position in said storing unit and said reproducing unit by holding said selected disk in said second disk holding means to set the other recorded surface of said selected disk on said reproducing unit in the reproducible state.

2. The disk reproducing apparatus according to claim 1, wherein said rotating-down means comprises a rotated-down means and a rotating-down drive means;

said rotated-down means comprising:
  a rotating-down shaft connected to said disk loader for supporting said disk loader provided in said transferring unit rotatably toward either of said two directions; and
  a rotating-down pin for rotating said disk loader around said rotating-down shaft as a center of rotation;

said rotating-down drive means comprising:
  a cam for rotating said rotating-down pin by being in contact with said rotating-down pin and being provided in a side of said reproducing unit; and
  a cam drive means for rotating said cam in either a clockwise direction or a counterclockwise direction; and
  said cam and said rotating-down pin being engaged with each other at a predetermined reproducing position, said rotating-down pin being rotated by rotation of said cam in either of the clockwise direction or the counterclockwise direction to rotate said disk loader down in either of said two directions.

3. A disk reproducing apparatus having the auto-changer according to claim 1, wherein said reproducing unit comprises a turntable having a disk chucking means; and said disk chucking means comprises a conical core portion provided in said turntable and pressed down from an upper side by a clamper rotated down together with said disk loader; a spring for applying a force on said conical core portion against the pressing force of said clamper; a cylindrical chucking portion for holding said conical core portion and said spring inside a cylinder; and a plurality of balls which are radially interposed between a conical surface of said conical core portion and an inner surface of the cylinder of said cylindrical chucking portion, radially expanded outward by the force of said spring applied to said conical surface and radially drawn back inward when the force of said spring applied on said conical surface is released; and thereby, when said selected disk is placed on said turntable and said clamper is returned to an original position together with said disk loader and the pressing force on said conical core portion by said clamper is released and the force of said spring is applied to said conical surface, said balls are radially expanded outward to apply a force onto said selected disk from an upper slant direction and fix said selected disk to said turntable.

4. A disk reproducing apparatus having an auto-changer comprising a storing unit for storing a plurality of disks having information recorded on both sides of each of said plurality of disks in a vertical position;
  a reproducing unit for reproducing the in formation recorded on said Plurality of disks in a horizontal position; and
  a transferring unit for extracting a selected one to two disks of said plurality of disks from said storing unit and transferring said selected disks to said reproducing unit by holding said selected disks, wherein said transferring unit further comprises:
    a disk loader which holds said selected disks, which, having been extracted from said storing unit at predetermined holding positions and having been moved in a direction parallel to respective surfaces of said disks, are in the vertical position on opposing side surfaces of said selected disk loader and are located adjacent to each other;
    a transferring device which transfers said disk loader together with said selected disks held by said disk loader in a direction perpendicular to one of said respective surfaces of said selected disks to a predetermined reproducing position of said reproducing unit; and
    a rotating-down means which rotates said disk loader together with said selected disks held by said disk loader downward in either of two opposing directions from the vertical position to said reproducing unit in the horizontal position when said disk loader is transferred to said predetermined reproducing position.

5. The disk reproducing apparatus according to claim 4, wherein said rotating-down means comprises a rotated-down means and a rotating-down drive means;

said rotated-down means comprising:
  a rotating-down shaft connected to said disk loader for supporting said disk loader provided in said transferring unit rotatably toward either of said two directions; and
  a rotating-down pin for rotating said disk loader around said rotating-down shaft as a center of rotation said rotating-down drive means comprising:
  a cam for rotating said rotating-down pin by being in contact with said rotating-down pin and being provided in a side of said reproducing unit; and a cam drive means for rotating said cam in either a clockwise direction or a counterclockwise direction; and
  said cam and said rotating-down pin are engaged with each other at said predetermined reproducing position, said rotating-down pin being rotated by rotation of said cam in either of the clockwise direction or the counterclockwise direction to rotate said disk loader down in either of said two directions.

6. A disk reproducing apparatus having the auto-changer according to claim 4, wherein said reproducing unit comprises a turntable having a disk chucking means; and said disk chucking means comprises a conical core portion provided in said turntable and pressed down from an upper side by a clamper rotated down together with said disk loader; a spring for applying a force on said conical core portion against the pressing force of said clamper; a cylindrical chucking portion for holding said conical core portion and said spring inside a cylinder; and a plurality of balls which are radially interposed between a conical surface of said conical core portion and an inner surface of the cylinder of said cylindrical chucking portion, radially expanded outward by the force of said spring applied to said conical surface and radially drawn back inward when the force of said spring applied on said conical surface is released; and thereby, when one of said selected disks is placed on said turntable and said clamper is returned to an original position together with said disk loader and the pressing force on said conical core portion by said clamper is released and the force of said spring is applied to said conical surface, said balls are radially expanded outward to apply a force onto said selected disk from an upper slant direction and fix said selected disk to said turntable.

* * * * *